United States Patent [19]

In 't Veld

[11] Patent Number: 4,676,054
[45] Date of Patent: Jun. 30, 1987

[54] METHOD AND DEVICE FOR MANUFACTURING AN OPTICAL CABLE ELEMENT

[75] Inventor: Steven H. K. In 't Veld, Holden, Mass.

[73] Assignee: N.K.F. Groep B.V., Rijswijk, Netherlands

[21] Appl. No.: 757,577

[22] Filed: Jul. 22, 1985

[30] Foreign Application Priority Data

Jul. 31, 1984 [NL] Netherlands ............... 8402386

[51] Int. Cl.⁴ ............... D02G 3/44; D01H 13/04
[52] U.S. Cl. ............... 57/6; 57/9; 57/293; 57/352
[58] Field of Search ........... 57/3, 6, 9, 11–13, 57/204, 293, 352

[56] References Cited

U.S. PATENT DOCUMENTS

| | | | |
|---|---|---|---|
| 4,112,660 | 9/1978 | Ferrentino et al. | 57/352 X |
| 4,154,049 | 5/1979 | King et al. | 57/352 X |
| 4,195,468 | 4/1980 | King et al. | 57/293 X |
| 4,205,899 | 6/1980 | King et al. | 350/96 |
| 4,384,446 | 5/1983 | Hope et al. | 57/6 |
| 4,450,676 | 5/1984 | Sakamoto et al. | 57/293 X |
| 4,497,164 | 2/1985 | Dotti et al. | 57/352 X |

Primary Examiner—Donald Watkins
Attorney, Agent, or Firm—Marc D. Schechter

[57] ABSTRACT

A continuous process for manufacturing an optical cable element in which a central draw core is rotated with a periodically reversing direction of rotation. The draw core is then provided (i) with synthetic resin tubes in which one or more optical fibers are incorporated, or (ii) with an extruded synthetic resin sheath with grooves in which one or more optical fibers are laid. As a result of the rotation of the draw core, the grooves in the synthetic resin sheath or the synthetic resin tubes follow helical paths with periodically reversing directions of rotation.

18 Claims, 5 Drawing Figures

METHOD AND DEVICE FOR MANUFACTURING AN OPTICAL CABLE ELEMENT

BACKGROUND OF THE INVENTION

The invention relates to a method of manufacturing an optical cable element. The method is a continuous process in which one or more optical fibers are provided around a central draw core. The fibers are either provided in slots in the surface of a synthetic resin sheath extruded around the draw core, or in synthetic resin tubes which loosely envelop the fibers and which are connected to the surface of the draw core with an adhesive. The slots or the tubes follow helical paths whose directions of rotation vary periodically.

The method is used to manufacture two types of optical cable elements. The first type is the so-called slotted-core-type, and the second type is the so-called loose-tube-type. Both types of cable elements known.

A slot or a synthetic resin tube as a rule contains only one optical fiber. However, it is possible to provide more fibers per slot or tube. The synthetic resin sheath extruded around the core as a rule has several slots extending parallel to each other. Analogously in an optical cable element of the loose-tube-type, several mutually parallel synthetic resin tubes are as a rule provided around the core. It is even possible to provide several layers of synthetic resin tubes around the core.

A helical path with a varying direction of rotation is also known as an SZ-configuration. It is very difficult to give the slots or the tubes the SZ configuration. In tubes, for example, an assembly of storage reels is rotated around the draw core with periodically varying direction of rotation. This requires the use of complicated and expensive apparatus.

Published Japanese patent application Kokai No. 52-126238 describes a method of manufacturing a synthetic resin core with SZ slots by using an extruder which rotates periodically to the left and to the right. A rotating extruder makes the process expensive and more complicated. The greatest disadvantage is that the extrusion rate is reduced. Due to shearing effects, the slots are crushed or are otherwise deformed if the extrusion rate is not reduced in this method.

In the process described in U.S. Pat. No. 4,205,899 a stationary (i.e. non-rotating) extruder is used. The nozzle of the extruder has such a shape that slots are formed in the surface of the extruded sheath. The sheath is cooled in such manner that it has reasonably solidified. The sheath is then twisted by using a twister which has a disc which is rotatable about the sheath. The disc has blades (reference numeral 19 in FIG. 4) which engage in the slots. By rotating the disc alternately to the left and to the right, shearing forces are exerted on the sheath which result in the slots, at the location where the synthetic resin leaves the nozzle and where the synthetic resin is most plastic, obtains an SZ configuration. The sheath is then further cooled and the slots are provided with optical fibers.

The disadvantage of the process described in U.S. Pat. No. 4,205,999 is that the core is cooled in two phases, and hence an interrupted cooling duct must be used. A more serious disadvantage is that the process is very critical due to the shearing forces which must be transmitted to the area where the synthetic resin leaves the nozzle. The danger exists that either the groove does not obtain the desired shape or the groove is damaged.

SUMMARY OF THE INVENTION

It is an object of the invention to produce an SZ optical cable element without reducing the production speed and with acceptable production tolerances.

Another object of the invention is to manufacture an optical cable element of the loose-tube type without co-rotating storage reels.

A further object is that in the manufacture of an optical cable element of the slotted-core-type an uninterrupted cooling system is used for the solidification of the extruded sheath.

These objects are achieved by a method in which the draw core, before being provided with the synthetic resin sheath or the tubes, is rotated, the direction of rotation varying periodically. As a result of rotating the draw core, the slots in the synthetic resin sheath or the synthetic resin tubes follow the described helical paths with varying directions of rotation.

The periodic reversal of the direction of rotation may be carried out at any desired instant. For example, the direction of rotation may be reversed after one complete revolution (360°) of the tube or slot, or after a part of a revolution, for example after 180°.

In a preferred form of the method according to the invention, the tubes or slots perform several revolutions in one direction of rotation before the reversal of the direction of rotation.

By way of example, the helix of the tube or groove has such a variation that first 3–8 revolutions to the right or to the left are made, and then 3–8 revolutions to the left or to the right are made.

The invention also relates to a device for performing the above-described method. The device comprises either (i) an extruder for extruding a sheath having slots around a draw core and a depositing machine for depositing optical fibers in the slots, or (ii) an adhesive dosing machine for providing a layer of adhesive on the draw core and a dosing device for providing synthetic resin tubes containing fibers on the draw core. Before the extruder or before the adhesive dosing machine, the device comprises a clamping device which is rotatable about the draw core and which comprises wheels with which the draw core can be clamped.

In a favorable embodiment, the wheels are distributed regularly about the circumference of the draw core. A suitable number of wheels is for example, three.

In another embodiment, the wheels are connected to resilient arms with which the pressure of the wheels on the draw core can be adjusted. Slip can be prevented by increasing the pressure. Moreover, the positions of the wheels can be adapted tto different diameters of the draw core.

In still another preferred embodiment, the wheels have a concave profile which matches the cylindrical surface of the draw core.

DESCRIPTION OF THE PREFERRED EMBODIMENTS

Figure 1:
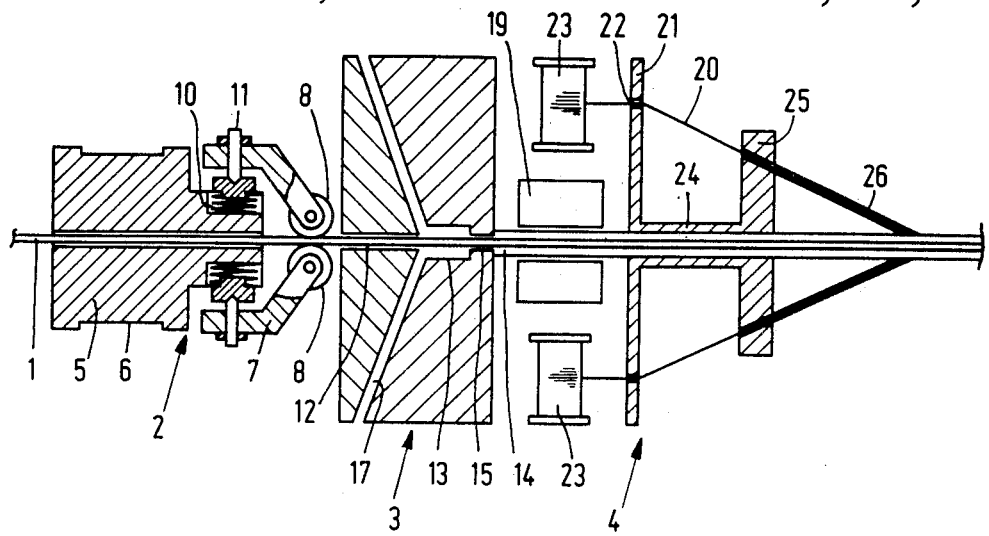
FIG. 1 schematically shows the device and method according to the invention.

Reference numeral 1 in FIG. 1 denotes a steel draw core which is constructed, for example, from a large number of twisted wires. The wires are chosen to assure that the draw core has the proper flexibility.

Figure 2:
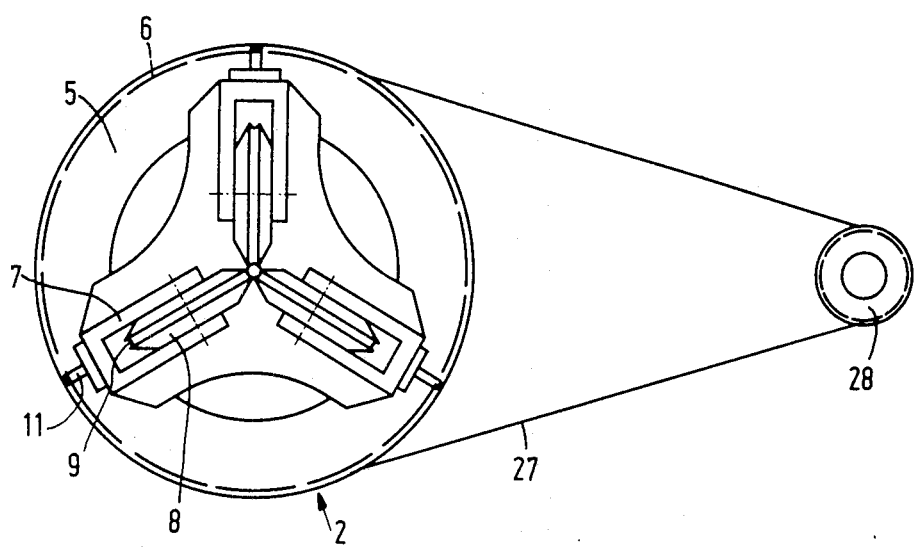
FIG. 2 is an elevational view of the clamping part of the device shown in FIG. 1.

The draw core 1 is guided continuously in FIG. 1 from the left to the right through successively, a clamping device 2, an extruder 3, and a depositing unit 4. The clamping device 2 has a support or chassis 5 with a tape guide 6. The support 5 is rotatable in an angular direction about the longitudinal axis of the draw core 1 as shown in FIG. 2.

The support member 5 comprises three arms 7 having wheels 8 at their free ends. As shown in FIG. 2, the wheels 8 have a concave profile 9 which engages the draw core 1. By using springs 10 and adjusting screws 11, the positions of the arms 7 and the pressures of wheels 8 on the draw core 1 can be adjusted and controlled.

The draw core 1 extending through the clamping device 2 is then rotated by rotating the arms 7 with wheels 8. The direction of rotation is reversed periodically. Preferably, the draw core is rotated a few revolutions in one direction, the direction of rotation is then reversed and the draw core is then rotated a few rotations in the opposite direction of rotation. A suitable periodic reversal of the direction of rotation is after b 5–10 revolutions.

Figure 3:
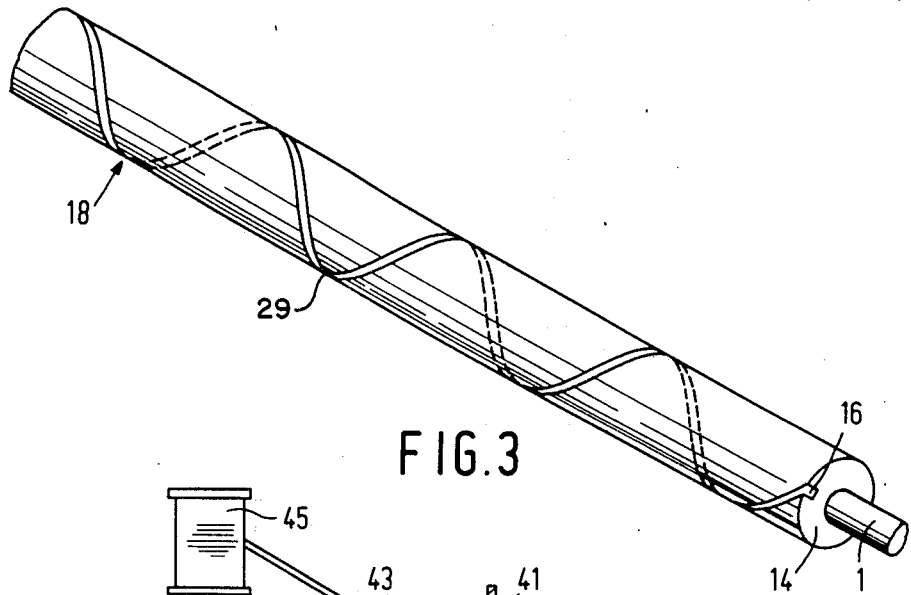
FIG. 3 is a perspective view of an optical cable element obtained by the method and the device shown in FIGS. 1 and 2.
Figure 4:
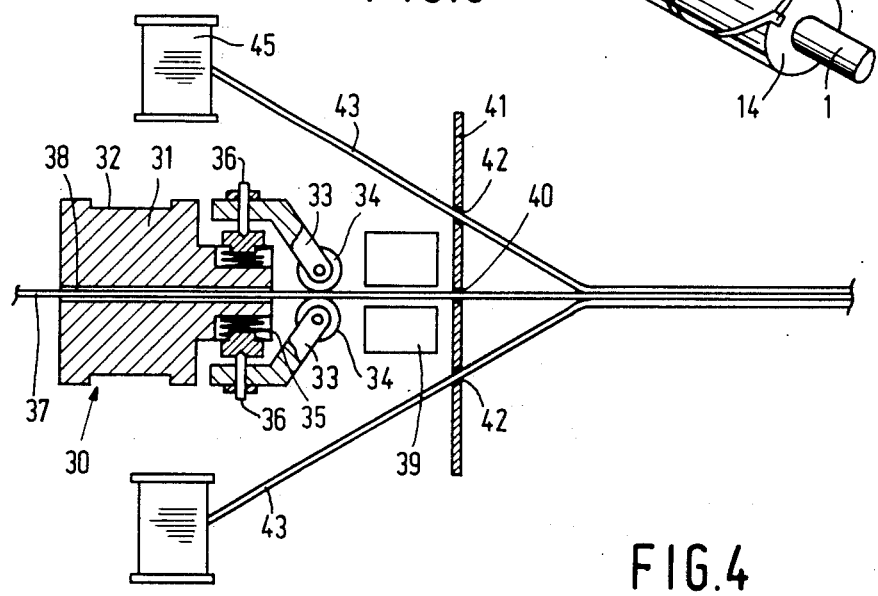
FIG. 4 schematically shows another embodiment of the method and device according to the invention.

The extruder 3 which has a central aperture 12 for guiding the draw core 1 is arranged immediately after the wheels 8. In the extruder head 13, the draw core 1 is provided with a cylindrical synthetic resin sheath 14. (FIG. 3.) Due to the presence of blades 15 in extruder head 13, sheath 14 has grooves 16. (FIG. 4).

The heated liquid synthetic resin is supplied to core 1 via ducts 17 in the extruder 3. As a result of the rotation of draw core 1 (with periodically reversing direction of rotation) caused by the clamping device 2, the grooves 16 follow a helical path 18 with a periodically reversing direction of rotation, as shown in FIG. 3.

The draw core 1 with synthetic resin sheath 14 is cooled by passing it through a water-filled cooling duct 19. By deposition unit 4, optical fibers 20 are laid in the grooves 16. The deposition unit 4 comprises an aligning plate 21 having apertures 22 through which fibers 20 are unwound from storage reels 23.

The aligning plate 21 is connected via a hollow shaft 24 to a dosing plate 25. Plate 25 comprises hollow flexible fingers 26. The optical fibers 20 are guided into grooves 16 via the hollow fingers 26 which open into and are guided by grooves 16. The deposition unit 4 is rotatable about the draw core 1.

Further synthetic resin sheaths or other sheaths may be provided around the resulting cable element. Various cable elements may also be bundled to form one larger optical cable.

In FIGS. 2 and 3 the same reference numerals are used for the same components as in FIG. 1.

The clamping device 2 (FIG. 2) is reversably rotated by using a drive belt 27 and drive motor shaft 28.

Reference numeral 29 in FIG. 3 denotes the point of reversal of the direction of rotation of the helical path 18 of groove 16.

Reference numeral 30 in FIG. 4 denotes the same clamping device as clamping device 2 in FIG. 1. The clamping device 30 comprises a supporting member 31, belt, guide 32, arms 33, wheels 34, springs 35 and adjusting screws 36.

A draw core 37 is passed in its longitudinal direction continuously through the central aperture 38 of the clamping device 30. Clamping device 30 is rotated in the angular direction with a periodically reversing direction of rotation in the manner shown in FIGS. 1 and 2. The draw core 37 is also rotated with a periodically reversing direction of rotation due to the clamping between the wheels 34.

A layer of adhesive, not shown, is provided around the draw core 37 by an adhesive dosing device 39. The draw core 37 with the layer of adhesive is then passed through the central aperture 40 of guide ring 41. Via apertures 42 in the guide ring 41 optical fibers 44 surrounded by loose synthetic resin tubes 43 (FIG. 5) are supplied to the draw core 37.

The loose synthetic resin tubes 43 with fibers 44 are glued on the surface of the draw core 37. The synthetic resin tubes 43 with fibers 44 are unreeled from the stationary storage reels 45. Reels 45 do not rotate about the draw core 37. Since the draw core 37 is rotated with a periodically reversing direction of rotation, the synthetic resin tubes 45 follow helical paths with periodically reversing direction of rotation.

Figure 5:
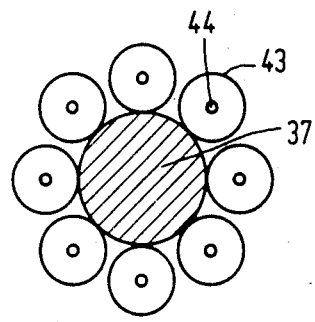
FIG. 5 is a partly schematic, partly cross-sectional view of an optical cable element obtained by the method and the device shown in FIG. 4.

FIG. 5 is a cross-sectional view of the resulting optical cable element in which the same reference numerals are used for corresponding components as in FIG. 4. The FIG. 5 element may, if desired, be provided with further sheaths or envelopes. Several optical cable elements may also be bundled to form more bulky optical cables.

What is claimed is:

1. A method of manufacturing an optical cable element, said method comprising the steps of:
   providing a central draw core having a longitudinal axis in a longitudinal direction along the length of the draw core and defining an angular direction around the longitudinal direction;
   clamping the central draw core in the angular direction but not in the longitudinal direction with a clamping device at a first longitudinal position;
   laying an optical fiber on the draw core at a second longitudinal position spaced from the first longitudinal direction;
   rotating the clamping device around the longitudinal axis of the draw core; and
   periodically reversing the direction of rotation of the clamping device.

2. A method as claimed in claim 1, characterized in that the steps of laying an optical fiber on the draw core comprises the steps of:
   extruding a synthetic resin sheath around the draw core;
   forming at least one groove in the sheath while extruding the sheath; and
   depositing an optical fiber in the groove.

3. A method as claimed in claim 2, characterized in that the clamping device is rotated several complete revolutions in one direction of rotation before the direction of rotation is reversed.

4. A method as claimed in claim 2, characterized in that the groove is formed at a substantially fixed angular position.

5. A method as claimed in claim 1, characterized in that the step of laying an optical fiber on the draw core comprises the steps of:
   coating the draw core with an adhesive;
   providing at least one synthetic resin tube containing an optical fiber loosely arranged therein; and
   depositing the tube on the adhesive on the draw core.

6. A method as claimed in claim 5, characterized in that the clamping device is rotated several complete revolutions in one direction of rotation before the direction of rotation is reversed.

7. A method as claimed in claim 5, characterized in that the tube is laid on the adhesive at a substantially fixed angular position.

8. A device for manufacturing an optical cable element from a central draw core having a longitudinal axis in a longitudinal direction along the length of the draw core and defining an angular direction around the longitudinal direction, said device comprising:
   means for clamping the central draw core in the angular direction but not in the longitudinal direction at a first longitudinal position;
   means for laying an optical fiber on the draw core at a second longitudinal position spaced from the first longitudinal position;
   means for rotating the clamping means around the longitudinal axis of the draw core; and
   means for periodically reversing the direction of rotation of the clamping means.

9. A device as claimed in claim 8, characterized in that the means for laying an optical fiber on the draw core comprises:
   means for extruding a synthetic resin sheath around the draw core;
   means for forming at least one groove in the sheath while extruding the sheath; and
   means for depositing an optical fiber in the groove.

10. A device as claimed in claim 9, characterized in that the clamping means comprises at least two wheels evenly spaced around the draw core in the angular direction, said wheels having axes of rotation tangent to circles concentric with the longitudinal axis.

11. A device as claimed in claim 10, characterized in tht the clamping means further comprises at least two resilient arms, each arm supporting one wheel and pressing the wheel against the draw core.

12. A device as claimed in claim 11, characterized in that each wheel has a concave profile which engages the draw core.

13. A device as claimed in claim 9, characterized in that the groove is formed at a substantially fixed angular position.

14. A device as claimed in claim 8, characterized in that the means for laying an optical fiber on the draw core comprises:
   means for coating the draw core with an adhesive; and
   means for depositing a synthetic resin tube, containing an optical fiber loosely arranged therein, on the adhesive on the draw core.

15. A device as claimed in claim 14, characterized in that the clamping means comprises at least two wheels evenly spaced around the draw core in the angular direction, said wheels having axes of rotation tangent to circles concentric with the longitudinal axis.

16. A device as claimed in claim 15, characterized in that the clamping means further comprises at least two resilient arms, each arm supporting one wheel and pressing the wheel against the draw core.

17. A device as claimed in claim 16, characterized in that each wheel has a concave profile which engages the draw core.

18. A device as claimed in claim 14, characterized in that the tube is deposited on the adhesive at a substantially fixed angular position.

* * * * *